Aug. 27, 1929.  D. W. KENT  1,725,925
TREATMENT OF FEED WATER FOR BOILERS, CONDENSERS, AND THE LIKE
Filed May 3, 1924
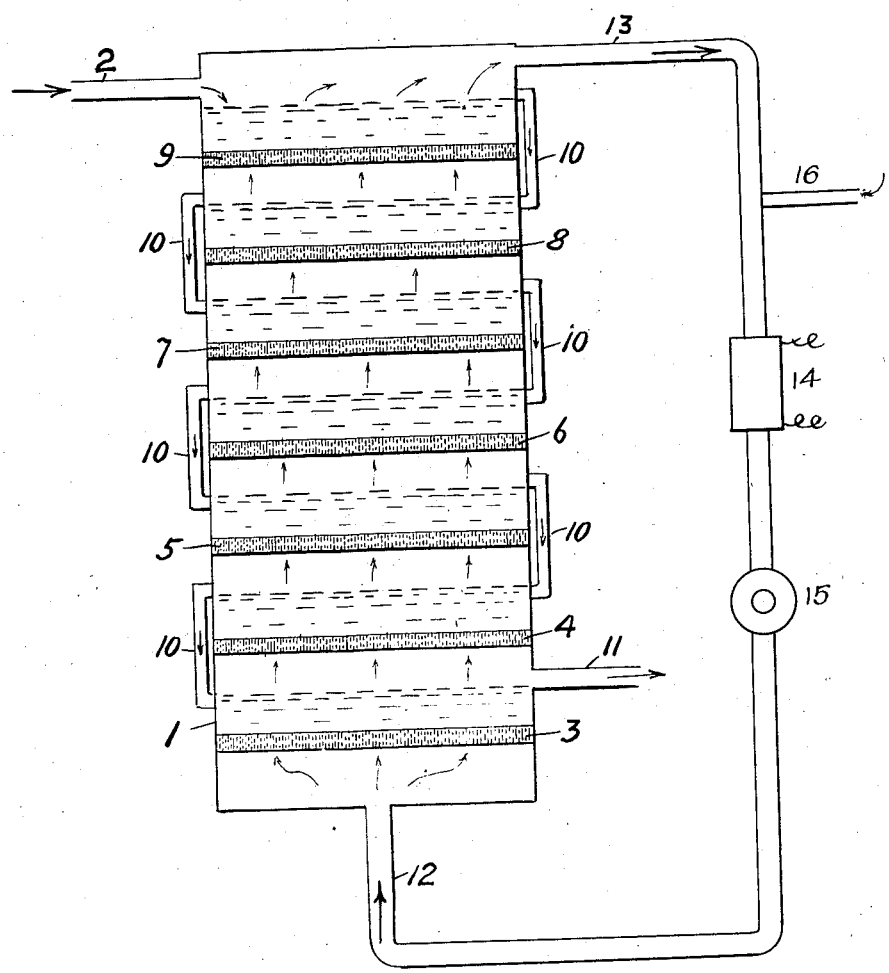
WITNESS:
INVENTOR
Donald W. Kent
BY
Augustus B. Stoughton.
ATTORNEY.

Patented Aug. 27, 1929.

1,725,925

UNITED STATES PATENT OFFICE.

DONALD W. KENT, OF PHILADELPHIA, PENNSYLVANIA.

TREATMENT OF FEED WATER FOR BOILERS, CONDENSERS, AND THE LIKE.

Application filed May 3, 1924. Serial No. 710,707.

The invention relates to improvements in the treatment of water for the prevention of scaling in feed water heaters, boilers, condensers and the like.

The principal object of the present invention is to provide a process for the purpose stated which can be practiced hot or cold and which is not dependent upon pressure conditions, which can be performed with various types of small apparatus inexpensive to install and operate, and which is efficient, reliable and expeditious.

The invention is a process for opposing the formation of scale in boilers, condensers, feed water heaters and other vessels in which water is heated, and, generally stated, the invention is an improved process for the removal of oxygen, and other gases which aid corrosion, from feed water for boilers, condensers and the like, and in the improved process the removal of such dissolved or suspended gases is effected by either replacement with an inactive gas by the simple procedure of bringing the water and replacement gas into a region where they are intimately mixed.

The accompanying drawing in the single figure illustrates diagrammatically and principally in section one type of apparatus which may be employed.

Referring to the drawing and in connection therewith describing the invention, 1 is a suitable shell or housing for limiting or defining the region of action and for supporting and spacing the various parts of the apparatus. Unpurified water or water of scale-forming or scaling character or quality enters the system through the pipe 2, where it passes over and is detained upon a number or series of trays 3, 4, 5, 6, 7, 8 and 9, of which the number may be increased or diminished. These trays are porous or pervious to gas and are substantially impervious to water, and they may well consist of porous filtering material or they may be of any conventional bubble-cap type. Pipes 10 lead the water from one tray to another until the finally purified water or water of non-scaling character or quality leaves the system through the pipe 11. The incoming inactive replacement gas enters at 12 under sufficient pressure to overcome the resistance of the water contained in the spaces between the trays, and after penetrating the trays and bubbling through the water resting thereon, it, or more accurately the excess of it if any, with the gases previously dissolved in the water and which have been released by replacement, finally leave through the pipe 13.

In order to further describe the method or process of this invention I will assume hydrogen or nitrogen or a mixture thereof to be the replacement gas used, but I do not limit the invention to the use of hydrogen as many other gases have practically the same effect and in some locations may be obtained more readily, and in this connection I will assume that oxygen is the gas to be removed from the water although it will be evident that gases other than oxygen may be advantageously displaced. Upon the feeding in of, for example, hydrogen or nitrogen, or a mixture thereof these gases will displace the oxygen in the water. The replacement gases or some thereof take the place of the contained oxygen which is driven out thereby. This action is based on Henry's law that when starting with a solution of the gas and a space above the solution containing none of the gas, the gas leaves solution until the rates of emission are equal, hence a gas may be entirely removed from a solution by bubbling a foreign gas through the liquid, the bubbles furnishing space to receive the emitted gas, presenting a large surface for this purpose. The displacement carries the dissolved gas with it, so that there is no re-solution. A stream of hydrogen is led into the system at 12 and bubbles through the water on the tray 3, and gradually the space between the surface of the water on the tray 3 and the tray 4 is occupied by pure hydrogen, while mixed gases which formerly occupied that space are driven or carried to the space above the water on the next tray 4, and so on to the top. In each of the spaces above the water on the respective trays equilibrium is reached between the oxygen removed with the hydrogen, on the one hand, and the oxygen to be replaced and remaining in solution in the water on the various trays, on the other hand, therefore it follows that the concentration of dissolved oxygen will be highest at the uppermost tray and lowest at the lowermost tray. Similarly the amount of oxygen in the gas mixture increases from none at the bottom or inlet 12 to a quantity at the top or outlet 13, depending on and substantially corresponding with the amount of dissolved oxygen entering with the water at 2.

The gas mixture leaving at 13 may be led to a suitable purifier 14 where the hydrogen is caused to combine with the oxygen, thus removing the latter, and the remaining mixture composed of hydrogen and other gases favorable for replacement, principally atmospheric nitrogen, and inert dissolved gas originally contained in the entering water can be recirculated through the system as by pump 15. In such case it is necessary to add hydrogen as at 16 to the gas stream to make up for the loss by combustion and solution and to allow for further purification by combustion in 14. It is evident that in a comparatively short time the gases favorable for replacement in the circulating mixture build up and take the place of hydrogen as a replacement gas, so that practically the only loss of hydrogen is the small quantity necessary for and utilized in the removal of oxygen from the gaseous mixture.

From the foregoing description it is evident that much of the trouble experienced in the past in the treatment of feed water has been eliminated.

The invention is independent of the addition of chemical compounds such as iron or its derivatives designed to remove oxygen by actual chemical combination, with the attendant loss of time and material. Apparatus adapted for the practice of this invention may be installed at any point in the feed water system irrespective of the temperature of the water, and the circulation of the gas can be readily adjusted to the quantity of water to be treated. The quantity of gas circulated need not be decreased for a smaller quantity of water because after the water becomes saturated with the circulating replacement gas the gas will pass through the water without loss of volume.

It will be obvious to those skilled in the art to which the invention relates that modifications may be made in details of procedure and in matters of mere form without departing from the spirit of the invention which is not limited as to such matters or otherwise than as the prior art and the appended claim may require.

I claim:

The process of fitting water for use in boilers, condensers and the like which consists in subjecting it to the action of a stream of gas adapted to replace the oxygen dissolved in the water with a gas inert in respect to the formation of scale and containing hydrogen, recirculating said stream of gas for the treatment of additional supplies of water, removing oxygen from the circulating stream by combustion with hydrogen, and introducing additional supplies of gas to the circulating stream to make up for the loss by combustion and solution.

DONALD W. KENT.